(12) United States Patent
Dubey et al.

(10) Patent No.: US 9,588,813 B1
(45) Date of Patent: Mar. 7, 2017

(54) DETERMINING COST OF SERVICE CALL

(71) Applicant: AMAZON TECHNOLOGIES, INC., Reno, NV (US)

(72) Inventors: Gaurav Dubey, Hyderabad (IN); Zachary Ganwise Fewtrell, Redmond, WA (US); Manoj Bhagwan Jadhav, Hyderabad (IN)

(73) Assignee: Amazon Technologies, Inc., Reno, NV (US)

( * ) Notice: Subject to any disclaimer, the term of this patent is extended or adjusted under 35 U.S.C. 154(b) by 579 days.

(21) Appl. No.: 13/913,283

(22) Filed: Jun. 7, 2013

(51) Int. Cl.
    *G06F 9/46*    (2006.01)
    *G06F 9/50*    (2006.01)

(52) U.S. Cl.
    CPC ..................... *G06F 9/50* (2013.01)

(58) Field of Classification Search
    None
    See application file for complete search history.

(56) References Cited

U.S. PATENT DOCUMENTS

| | | | | |
|---|---|---|---|---|
| 5,797,129 A * | 8/1998 | Rohan | G06Q 10/06 | 705/7.22 |
| 6,711,616 B1 * | 3/2004 | Stamm | H04L 67/42 | 709/223 |
| 7,526,452 B2 * | 4/2009 | Agarwal | G06Q 20/102 | 705/52 |
| 7,665,090 B1 * | 2/2010 | Tormasov | G06F 9/4881 | 718/104 |
| 7,672,882 B2 * | 3/2010 | Agarwal | G06Q 20/102 | 705/30 |
| 8,260,840 B1 * | 9/2012 | Sirota | G06F 9/5061 | 370/216 |
| 8,615,455 B2 * | 12/2013 | Albaugh | G06Q 10/06316 | 705/35 |
| 8,625,770 B1 * | 1/2014 | Croak | 379/133 | |
| 2002/0194251 A1 * | 12/2002 | Richter | G06F 9/5011 | 718/105 |
| 2003/0046396 A1 * | 3/2003 | Richter | G06F 9/505 | 709/226 |
| 2003/0120704 A1 * | 6/2003 | Tran | G06F 9/5044 | 718/104 |
| 2003/0233391 A1 * | 12/2003 | Crawford, Jr. | G06F 9/505 | 718/104 |
| 2004/0073661 A1 * | 4/2004 | Eibach | G06Q 30/0283 | 709/224 |
| 2005/0010608 A1 * | 1/2005 | Horikawa | G06F 9/4862 | |
| 2005/0120111 A1 * | 6/2005 | Bailey | G06F 11/3409 | 709/224 |

(Continued)

*Primary Examiner* — Hiren Patel
(74) *Attorney, Agent, or Firm* — Lindauer Law, PLLC (57) ABSTRACT

Computing platforms may enable clients to use services to perform data processing jobs. A given job may utilize several services in a service call pattern. Each of these services consumes resources during execution. Described herein are systems, devices and methods for determining costs associated with performance of a service call pattern. Weight data may be generated for each service using various metrics. As service calls are made in the service call pattern, an accumulated weight value is generated which is indicative of the weight data of the services in the service call pattern. The accumulated weight data may represent metrics such as amounts of resources consumed, latency, and transactions per second.

4 Claims, 10 Drawing Sheets

(56) References Cited

U.S. PATENT DOCUMENTS

| | | | |
|---|---|---|---|
| 2005/0125314 A1* | 6/2005 | Agarwal | G06Q 10/06315 |
| | | | 705/30 |
| 2006/0041668 A1* | 2/2006 | Dinger | H04L 12/2602 |
| | | | 709/229 |
| 2006/0152756 A1* | 7/2006 | Fellenstein | G06Q 40/04 |
| | | | 358/1.15 |
| 2006/0168586 A1* | 7/2006 | Stone | G06F 9/485 |
| | | | 718/104 |
| 2007/0061464 A1* | 3/2007 | Feng | H04L 67/1002 |
| | | | 709/226 |
| 2007/0074207 A1* | 3/2007 | Bates | G06F 9/4881 |
| | | | 718/1 |
| 2008/0235119 A1* | 9/2008 | Agarwal | G06Q 20/102 |
| | | | 705/34 |
| 2009/0007075 A1* | 1/2009 | Edmark | G06F 11/3612 |
| | | | 717/128 |
| 2010/0157822 A1* | 6/2010 | Ivanov | H04L 41/5009 |
| | | | 370/252 |
| 2010/0286952 A1* | 11/2010 | Mukherjee | G06F 11/34 |
| | | | 702/179 |
| 2012/0167101 A1* | 6/2012 | Kandula | H04L 67/325 |
| | | | 718/102 |
| 2012/0209568 A1* | 8/2012 | Arndt | G06F 11/3089 |
| | | | 702/183 |

* cited by examiner

DETERMINING COST OF SERVICE CALL

BACKGROUND

Services executing on computing devices provide a wide variety of data processing jobs. A given job may utilize several services in a service call pattern. For example, a first service may be called, which in turn calls a second service, which in turn calls a third service, and so on. Performance of the services uses resources on the computing devices, such as memory, processor time, input/output, and so forth. As information processing systems continue to grow in size and complexity with many interconnected services processing information in ever more complicated service call patterns, determining the resource usage associated with service call patterns has become challenging.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems and methods for determining costs associated with service call patterns. A given job, such as presenting a web page, may call upon several services. A service may be a set of instructions that execute to perform particular computational tasks. For example, one service may retrieve information from a database, while another service calculates a value from inputs, and so forth. A service call includes a request to the service to perform the particular computational tasks. Each of these services may in turn call upon other predecessor services. The services used to complete a particular job comprise a service call pattern. For example, a first service may request a second service to provide particular data. In response to receiving the request, the second service may perform a computational task by generating the particular data requested, and transmitting the particular data to the first service. The first service and the second service thus comprise a service call pattern. The services may execute on one or more servers.

Performance of the computational tasks, such as used in providing the service, consumes resources. The resources consumed may include memory, processor, data transfer, and so forth.

Different service call patterns may consume different amounts of resources. For example, a first service may send a first service call to a second service, requesting first data from the second service. Continuing the example, to perform this request, the second service may send two additional service calls to two additional services. These two additional services consume resources when performing the computational tasks requested by the two additional service calls. As a result, to perform the first service call, each of the second service and the two additional services consume different resources.

The services may be configured to generate metrics which are indicative of resources consumed during operation. These metrics may be generated during operation of actual responses to service calls, or based on the execution of benchmark tests using predetermined service calls. Weight data may then be generated for the particular service. This weight data is a value representative of resources consumed to respond to a service call. In some implementations, different component metrics used to generate the weight data may have different weight factors, allowing the weight data to be tailored.

During processing of the service call pattern, responses to the service calls may include weight data for the services. This weight data for the various service calls in the service call pattern may be used to generate accumulated weight data. The accumulated weight data is thus indicative of the resources used to complete the service call pattern. For a particular service which generates accumulated weight data, the accumulated weight data may include a value which represents the accumulated amount of resources consumed to perform a plurality of computational tasks.

By analyzing the accumulated weight data various benefits are provided to system administrators, planners, troubleshooters, and other stakeholders. Alarms may be set to indicate unexpected changes in accumulated weight data for a service call pattern which may indicate trouble or an unusual situation. Accumulated weight data may be analyzed for trending, to determine when capacity needs to be added or removed. The accumulated weight data may be used to determine cost data or invoice data associated with service call patterns. This cost data may be used to optimize particular service call patterns after identifying which service call patterns are associated with relatively high costs. Using the techniques described here, stakeholders are thus able to more easily and effectively manage their systems.

Illustrative System

Figure 1:
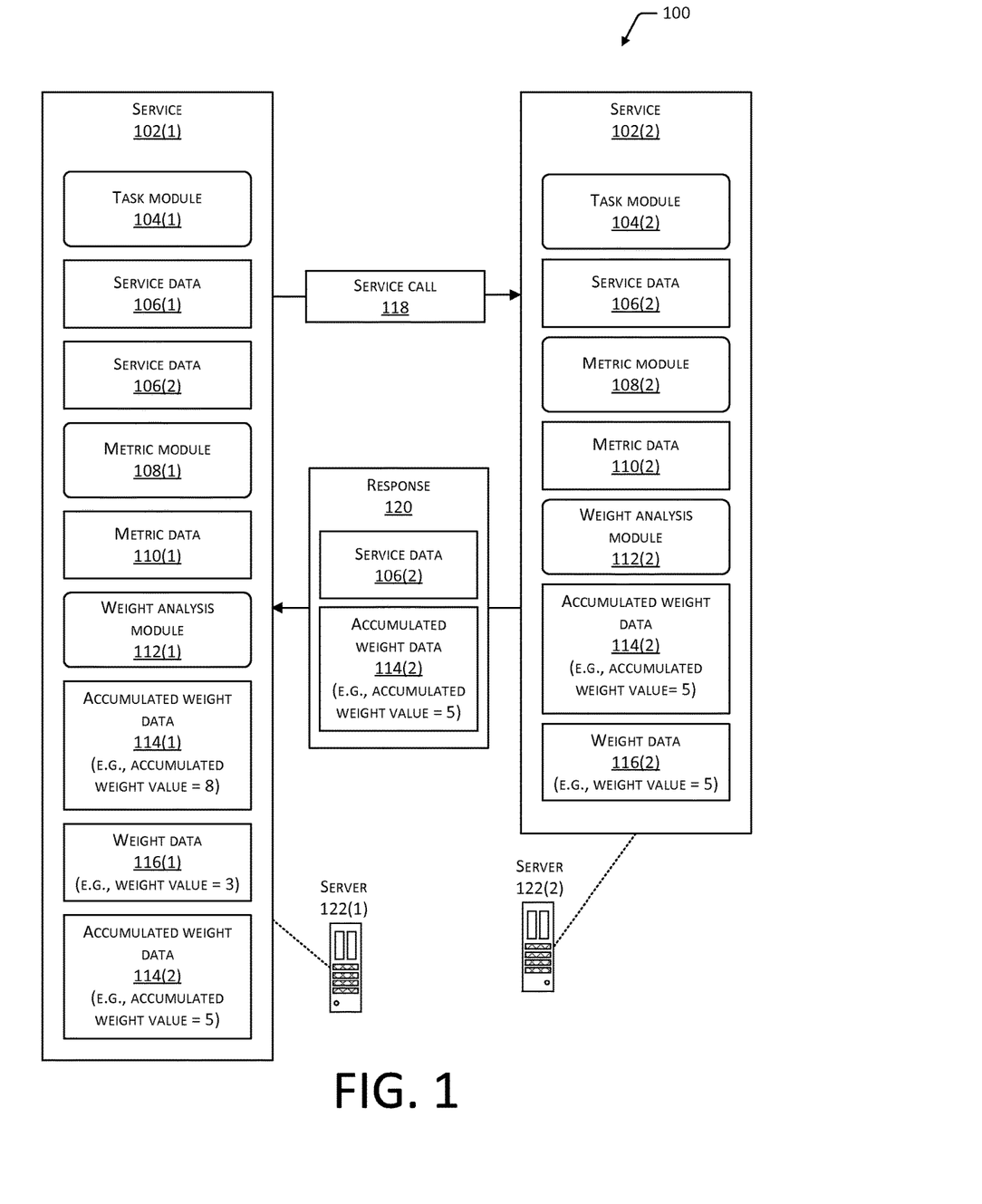
FIG. 1 is a block diagram of a system configured to generate accumulated weight data for a service call pattern.

FIG. 1 is a block diagram of a system 100 configured to generate accumulated weight data for a service call pattern involving a single predecessor service. The system 100 includes a service 102(1) which is communicatively coupled to a service 102(2) using one or more networks. In this illustration, two services 102(1) and 102(1) are shown. The system 100 may include more than two services such as the services 102(1), 102(2), ..., 102(S). The services 102(S) may or may not be similar in construction, components, modules, and so forth. For example, the service 102(1) may be a front-end service configured to deliver a web page to a user device, while the service 102(2) may be a data warehouse, data aggregator, and so forth.

The service 102 performs one or more computational tasks which support one or more functions. The service 102 may include a set of instructions that execute to perform particular computational or data processing tasks. The service 102 may be a set of instructions configured to, upon execution, receive a service call comprising input data and generate a response based on the input data. As discussed in more detail below, the response may include service data, metric data, weight data, and accumulated weight data. Services 102(S) may work in conjunction with one another, making service calls to one another and providing responses.

The service 102(1) may include several modules. A task module 104(1) is configured to perform one or more computational or data processing tasks which are configured to generate service data 106(1). The service data 106 may include a variety of data, such as image data, video data, product data, advertising data, offer service data, shipping data, search page data, tax data, pricing data, and so forth.

A metric module 108(1) is configured to generate metric data 110(1). A weight analysis module 112(1) is configured to generate weight data 116(1) and accumulated weight data 114(1). The accumulated weight data 114(1) is based on the weight data 116(1) and the accumulated weight data 114(2) which is received from service 102(2). The accumulated weight data 114(2), in turn, is based on the weight data 116(2). These modules are discussed in more detail below.

The service 102(2) may include several modules. The service 102(2) includes a task module 104(2) configured to generate service data 106(2). A metric module 108(2) is configured to generate metric data 110(2) associated with the operation of the service 102(2). The weight analysis module 112(2) is configured to generate accumulated weight data 114(2) using weight data 116(2).

The service 102(1) and service 102(2) may perform different tasks. For example, the service 102(1) may comprise a front-end to provide web pages to client devices, while the service 102(2) may provide business logic such as calculating taxes.

The services 102 may communicate with one another using a network. The network may include one or more of a local area network, a wide area network, broadcast network, a personal area network, a wired or wireless local area network, and so forth. In some implementations, the network includes at least one of Ethernet®, Wi-Fi® as promulgated by the Wi-Fi Alliance, 3G and 4G, Bluetooth® as promulgated by the Bluetooth Special Interest Group, and so forth.

As illustrated, the service 102(1) transmits a service call 118 to the service 102(2). The service call 118 includes a request for performance of a computational or data processing task. The output of the performance of the computational task may be the service data 106(2). In response to receiving the service call 118, the task module 104(2) performs the tasks and generates the service data 106(2). For example, the service call 118 may include a request to the service 102(2) to return the price of a particular product.

The metric module 108(2) is configured to generate the metric data 110(2). The metric data 110(2) comprises one or more quantitative measurements of the operation or performance of the service 102(2). As described in more detail below, the metrics may include processor usage, memory usage, disk usage, and so forth.

The weight analysis module 112(2) generates the weight data 116(2) based at least on the metric data 110(2). In this example, the weight data 116(2) includes a weight value of "5". The weight value may represent the amount of resources consumed on a server to process the computational task performed by the service 102(2). The resources consumed may include a variety of resources, such memory resources, processing resources, and so forth.

In some implementations, the weight analysis module 112 or another module may perform data analysis on the accumulated weight data 114. In one implementation, a regression analysis may be applied to the accumulated weight data 114. The results of this analysis may be used to define capacity scaling models for one or more services 102(S), determine hardware provisioning, and so forth. Such a configuration may enable an administrative user to analyze capacity and predict future needs. The analytical results based on the accumulated weight data 114 may be associated with other metrics, such as transactions per second. For example, a service call pattern associated with an accumulated weight value of "3" may be determined to support 1000 transactions per second.

In some implementations, a particular service 102 may enable a user to select or change the metrics used to generate the weight value, how those metrics are individually weighted, and so forth. For a particular service 102, an administrative user may desire to manage which metrics are used to generate the weight value based on a historical analysis of which metrics correspond to a need to purchase additional resources.

The metrics used to generate the weight data 116 may be different for different services 102(S). For example, a first set of metrics (e.g., processor usage and memory usage) may be selected and used to generate the weight value for the service 102(2), and a different, second set of metrics (e.g., disk usage and latency) may be selected and used to generate the weight value for the service 102(1).

Using the weight data 116(2), the weight analysis module 112(2) generates the accumulated weight data 114(2). Continuing the example shown in FIG. 1, for the service 102(2), the accumulated weight data 114(2) includes an accumulated weight value of "5". The weight analysis module 112(2) may generate the accumulated weight data 114(2) using other accumulated weight data 114 received from predecessor services (not shown). However, in FIG. 1, there are no predecessor services 102(S) relative to the service 102(2).

In some implementations, the metrics used to generate the accumulated weight data 114 may be varied. The metrics used to generate the accumulated weight data 114(2) may be different from the metrics used to generate the accumulated weight data 114(1).

In FIG. 1, the service 102(2) transmits a response 120 to the service call 118. The response 120 includes the service data 106(2) and the accumulated weight data 114(2). In some implementations, the service 102(2) may transmit the service data 106(2) separately from the accumulated weight data 114(2).

In FIG. 1, the service 102(1) receives the response 120. The task module 104(1), which now has available the service data 106(2) which is a prerequisite for completion, generates the service data 106(1) using the service data 106(2). For example, the service data 106(2) may include a product identification number which the task module 104(1) may then use to retrieve pricing data associated with the product identification number.

The metric module 108(1) is configured to generate the metric data 110(1) associated with the service 102(1). The metric data 110(1) includes one or more quantitative measurements of the performance of the service 102(1).

Using the metric data 110(1), the weight analysis module 112(1) generates the weight data 116(1). The weight data 116(1) indicates the resources consumed by the service 102(1) to process the service call 118. In FIG. 1, the weight data 116(1) includes a weight value of "3" which represents the amount of resources consumed to process the computational task performed by the service 102(1).

The weight analysis module 112(1) generates the accumulated weight data 114(1) using the weight data 116(1) and the accumulated weight data 114(2). The accumulated weight data 114(1) includes an accumulated weight value that represents the accumulated amount of resources consumed by the services 102 in the service call pattern, up to this point. Continuing the example, as shown in FIG. 1, for the service 102(1), the accumulated weight data 114(1) is generated based on a sum of the weight value for the second service 102(2) (i.e., "5") and the weight value for the first service 102(1) (i.e., "3") which is indicated as an accumulated weight value of "8".

The service 102 may be configured to execute across one or more servers 122. The server 122 is described in more detail below with regard to FIG. 7. In some implementations, the service 102 may be executed on other devices such as a mobile digital device, a smartphone, a tablet computer, a desktop computer, a laptop computer, a television, an electronic book ("eBook") reader, a gaming console, a set-top box, a media player, an in-vehicle communication system, wearable computing device.

The accumulated weight data 114 may enable administrative users to track how the service call patterns are using resources. Administrative users may use this knowledge to allocate costs of resource consumption associated with service call patterns to different services or entities which generate the service calls in those service call patterns.

Figure 2:
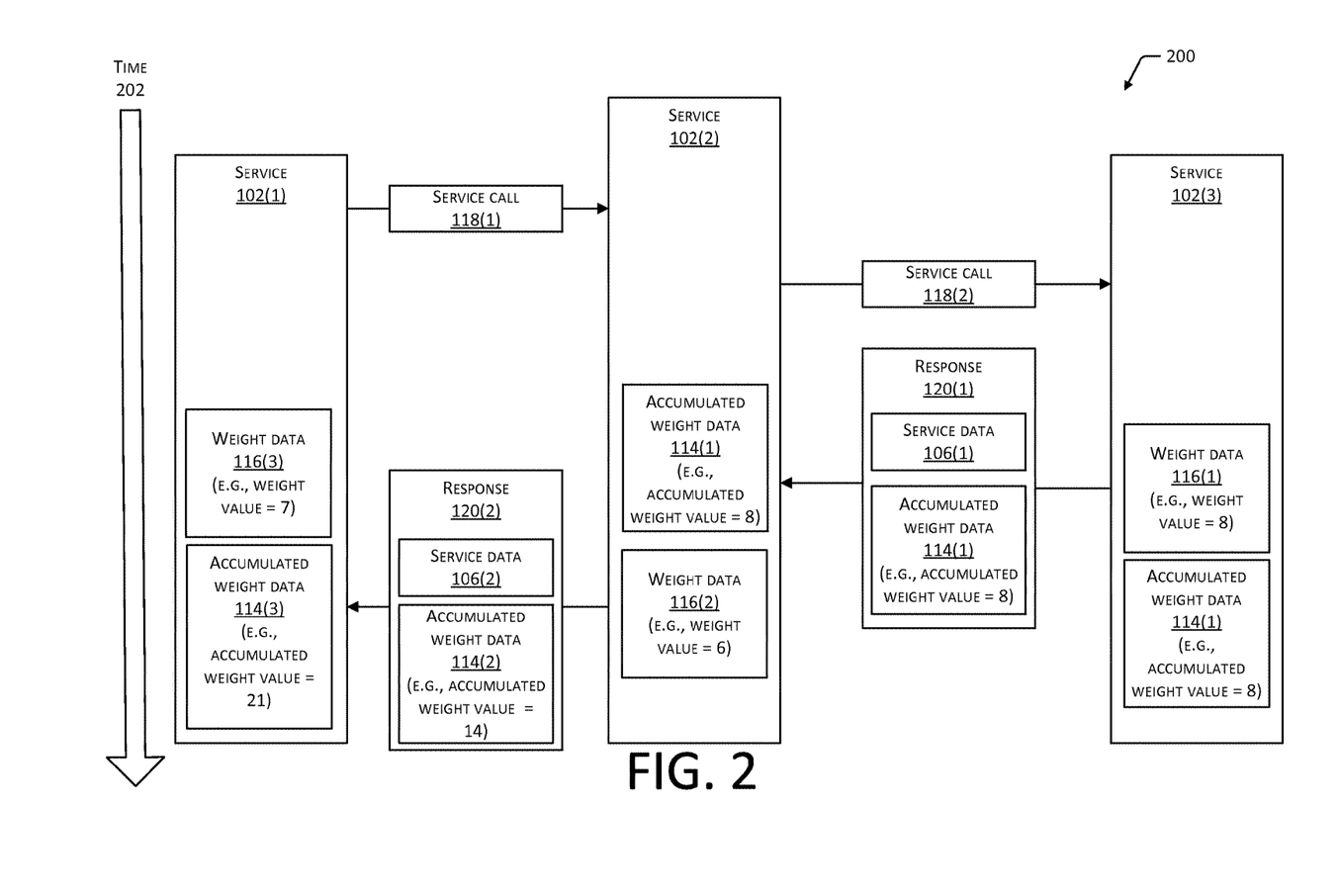
FIG. 2 is a block diagram of a service call pattern involving three services and generating accumulated weight data for the service call pattern.

FIG. 2 is a block diagram of a system 200 configured to generate accumulated weight data for a service call pattern. In this illustration, time increases down the page, as indicated by the arrow 202. The series of service calls 118(1) and 118(2) and responses 120(1) and 120(2) together comprise a service call pattern.

In FIG. 2, the service 102(1) transmits the service call 118(1) to the service 102(2). For example, the service call 118(1) may include a request for a computational task to generate search results comprising particular products based on entered search terms. To perform the computational task, the service 102(2) in turn transmits the service call 118(2) to the service 102(3), requesting another computational task. Continuing the example, the service call 118(2) may request image data depicting the products associated with the requested search results.

In response to receiving the service call 118(2), the service 102(3) may generate the service data 106(1). Continuing with the example, the service data 106(1) may include the image data depicting the products associated with the requested search results.

The service 102(3) may generate the weight data 116(1). The weight data 116(1) may include a weight value that represents the amount of resources consumed to process the computational task performed by the service 102(3). As shown in FIG. 2, for the service 102(3), the weight data 116(1) includes a weight value of "8".

Using the weight data 116(1), the service 102(3) generates the accumulated weight data 114(1). Continuing with the example, as shown in FIG. 2, for the service 102(3), the accumulated weight data 114(1) includes an accumulated weight value of "8".

In FIG. 2, the service 102(3) transmits the response 120(1) to the service 102(2). In this example, the response 120(1) includes the service data 106(1) and the accumulated weight data 114(1).

Using the service data 106(1), the service 102(2) generates the service data 106(2). Continuing with the example, the service 102(2) may retrieve product description information for the products and combine this information with the image data depicting the products associated with the requested search.

The service 102(2) generates the weight data 116(2). The weight data 116(2) includes a weight value that represents the amount of resources consumed to process the computational task performed by the service 102(2). As shown in FIG. 2, for the service 102(2), the weight data 116(2) includes a weight value of "6".

The service 102(2) generates the accumulated weight data 114(2). The accumulated weight data 114(2) includes an accumulated weight value that represents the accumulated amount of resources consumed to process the computational task performed by the service 102(2) and the service 102(3). Continuing the example, as shown in FIG. 2, for the service 102(2), the accumulated weight data 114(2) includes an accumulated weight value of "14".

Responsive to the service call 118(1) received from the service 102(1), the service 102(2) transmits the response 120(2). The response 120(2) includes the service data 106(2) and the accumulated weight data 114(2). The service 102(1), in order to make the service call 118(1) and process the response 120(2) has consumed resources. This consumption is represented by weight data 116(3), which in this example has a weight value of "7". Using the incoming accumulated weight data 114(2) associated with the response 120(2) and the weight data 116(3), the service 102(1) may determine that, for the entire service call pattern, the accumulated weight data 114(3) has a weight value of "21".

In some implementations, the service 102 may enable a user to select or change which weight data 116 is received by the service 102. For example, the user may configure a particular service 102 to receive the weight data 116 generated by one or more particular predecessor services 102, and not the accumulated weight data 114 for an entire service call pattern. For example, the response 120(2) may include the weight data 116(2) and not the accumulated weight data 114(2). In another example, the response 120(2) may include the weight data 116(1) and the weight data 116(2), and not the accumulated weight data 114(2). In this example, the weight data 116(1) and 116(2) may comprise an array of separated weight data 116. The service 102 may generate the accumulated weight data 114 after receiving the separated weight data 116.

Figure 3:
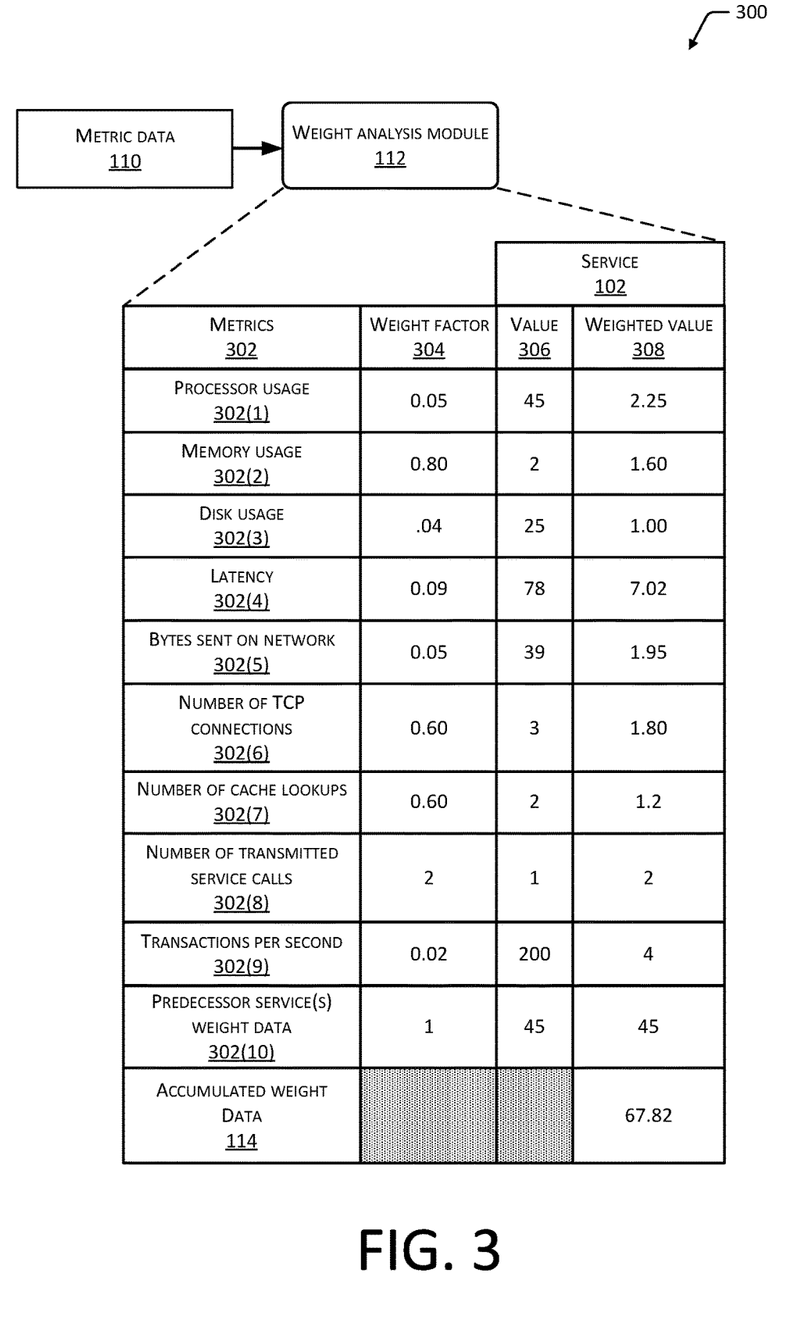
FIG. 3 illustrates generation of the accumulated weight based on one or more metrics.

FIG. 3 is an illustration 300 of generation of the accumulated weight data 114 based on metric data 110. The weight analysis module 112 accesses the metric data 110. The metric data 110 may be stored in log files or other data structures. The metric data 110 includes metrics 302 and weight factors 304.

The metrics 302 comprise data which may be qualitative or quantitative about one or more aspects of operation of the service 102, or the one or more servers 122 executing the service 102. The metrics 302 include processor usage 302(1), memory usage 302(2), disk usage 302(3), latency 302(4), bytes sent on network per second 302(5), number of TCP connections 302(6), number of cache lookups 302(7), number of transmitted service calls 302(8), transactions per second 302(9), predecessor service(s) weight data 302(10), and so forth. A metric may have an associated value 306. For example, the memory usage 302(2) may indicate "2" indicating a quantity of memory used to perform the service.

The weight factors 304 are configured to allow configuration of how the weight data 116 is generated. The service 102 may be configured to enable the user to select or change one or more of the weight factors 304 using an input device. The service 102 may be configured to automatically generate or determine one or more of the weight factors 304.

In FIG. 3 the weight factor 304 is illustrated as a factor to develop a weighted mean, wherein the weight value 306 is multiplied by the weight factor 304. For example, the weight factor 304 may be set to less than one to diminish the impact of a particular metric 302 or greater than one to increase the impact of a particular metric 302 on the weight data 116. In other implementations, functions other than, or in addition to, the weighted mean may be used.

Continuing the example, the metric 302(5) for gigabytes sent on network 302(5) is given a relatively low weight factor 304 of "0.05", while the number of transmitted service calls 302(8) has a weight factor 304 of "2". As a result, the weight data 116 for the service 102 may be more significantly impacted by the number of service calls transmitted than the amount of data transferred. The weight factors 304 may be adjusted, allowing for the weights to be tailored to particular analytical tasks.

The weight factor 304 and the value 306 are used as inputs to a function which generates the weighted value 308. While the weighted value 308 is illustrated here as a multiplicative product of the weight factor 304 and the value 306, in other implementations other mathematical or logical operations may be used. In some implementations, the service 102 determines the weighted values 308 using a nonlinear function or operation. In one example employing a nonlinear function, a first value 306 of "1" may correspond to a generated weighted value 308 of "4", a second value 306 of "2" may correspond to a generated weighted value 308 of "5", and a third value 306 of "3" may correspond to a generated weight value 308 of "10".

The weighted values 308 may be summed or otherwise combined to generate the accumulated weight data 114. Continuing the example, in this illustration the service 102 has a total weight of "67.82". As illustrated here, the predecessor services weight data 302(10) may comprise the accumulated weight data 114 received from predecessor service 102 in the service call pattern. As a result, a weight factor 304 may be applied to the predecessor weight data 302(10).

Using these techniques, the weight analysis module 112 is thus able to generate the accumulated weight data 114. By analyzing the accumulated weight data 114, a service 102 or user is thus able to generate information indicating the extent of resources used to fulfill a particular service call pattern.

Illustrative Scenarios and Processes

Figure 4:
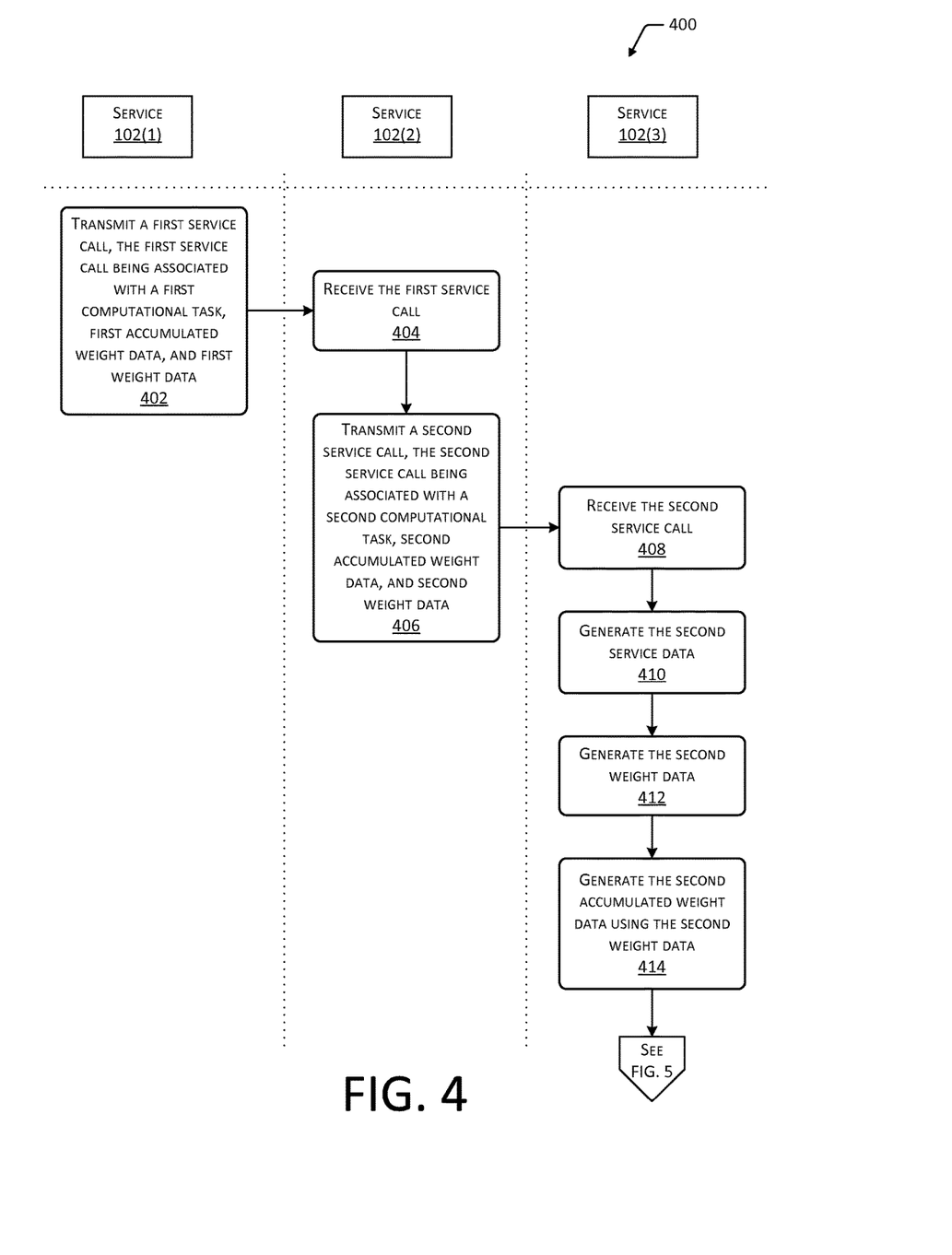
FIGS. 4 to 6 depict a flow diagram illustrating a process of generating accumulated weight data for a service call pattern using weight data accumulated across a plurality of services.
Figure 5:
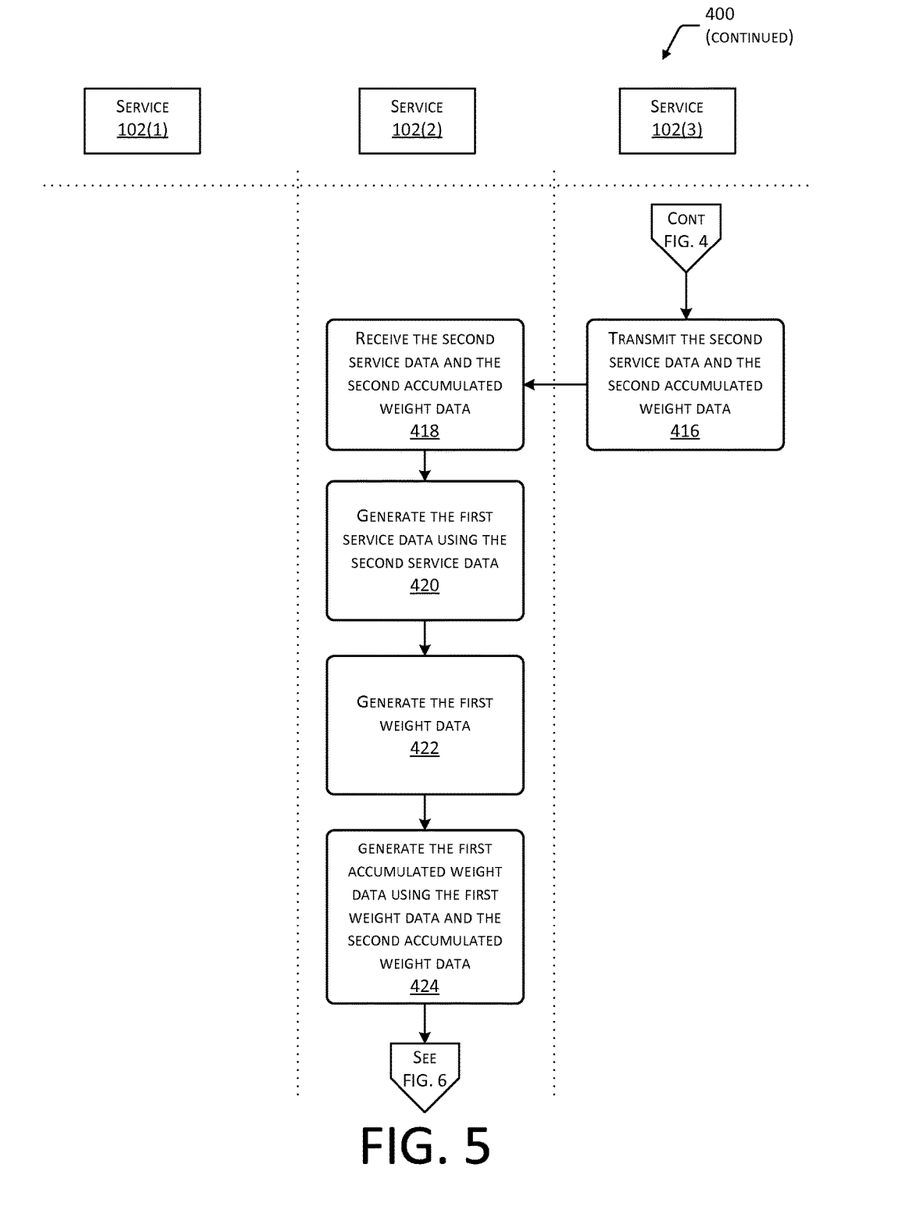
Figure 6:
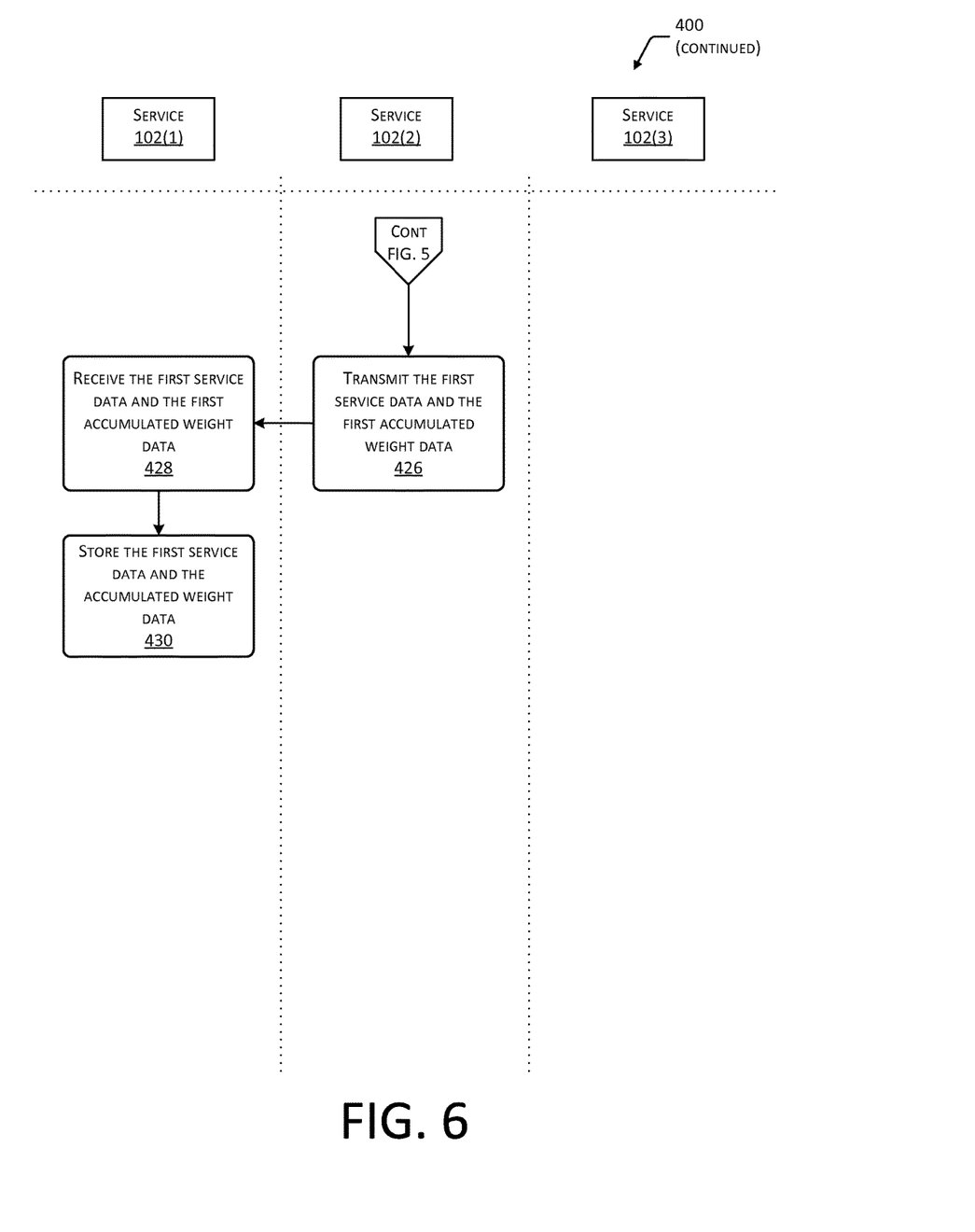

FIGS. 4 to 6 depict a flow diagram illustrating a process 400 of generating accumulated weight data 114 for a service call pattern using weight data 116 accumulated across a plurality of services 102. Although the process 400 is described with reference to the flow diagram illustrated in FIGS. 4-6, other methods of performing the acts associated with the process 400 may be used. For example, the order of many of the steps may be changed, some of the steps described may be optional, and additional steps may be included.

At block 402, the service 102(1) transmits a first service call 118(1) to the service 102(2). In this example, the first service call 118(1) is associated with a first computational task, first accumulated weight data 114(1), and first weight data 116(1). For example, the first service call 118(1) may include a request for particular user's shipping address. In this example, the service 102(2) may be configured to access a database which stores shipping addresses associated with user account numbers. At block 404, the service 102(2) receives the first service call 118(1). In this example, the service call pattern involves the service 102(2) using information which is provided by service 102(3).

At block 406, the service 102(2) transmits a second service call 118(2) to the service 102(3). The second service call 118(2) is associated with a second computational task, second accumulated weight data 114(2), and second weight data 116(2). Continuing with the example, the second service call 118(2) may include a request for the particular user's account number. At block 408, the service 102(3) receives the second service call 118(2).

At block 410, the service 102(3) generates the second service data 106(2). Continuing with the example, the service 102(3) may generate data representative of the user's account number. At block 412, the service 102(3) generates the second weight data 116(2). In some implementations, the services 102(S) may be configured to generate the weight data 116 after an occurrence of a predetermined number of computational tasks. For example, the services 102(5) may be configured to generate the weight data 116 for every one thousand computational tasks to minimize the load resulting from generating the weight data 116. In some implementations, to minimize the load resulting from generating the weight data 116, the services 102(S) may generate the weight data 116 at randomly generated time periods. In one example, the server 122 includes a random time interval generation module configured to generate random time intervals. Based on the random time intervals, the services 102(S) may generate the weight data 116. In one example, a historical analysis of the generated weight data 116 may show that the weight data 116 was generated on January 1 at 8:02 a.m. local time, January 1 at 8:55 a.m. local time, January 1 at 12:32 p.m. local time, January 1 at 6:43 p.m. local time, and so forth. In another example, the generated weight data 116 may show that the weight data 116 was generated on July 8 at 9:32 p.m. local time, July 10 at 1:05 a.m. local time, July 17 at 4:57 p.m. local time, August 2 at 2:35 p.m. local time, and so forth.

At block 414, the service 102(3) generates the second accumulated weight data 114(2) using the second weight data 116(2). In this example, the accumulated weight data 114(2) may represent the amount of resources consumed to generate the second service data 106(2). In other examples, the accumulated weight data 114(2) may represent the amount of resources consumed to generate the second service data 106(2) and the amount of resources consumed to generate the accumulated weight data 114(2). At block 416, the service 102(3) transmits the second service data 106(2) and the second accumulated weight data 114(2) to the service 102(2). At block 418, the service 102(2) receives the second service data 106(2) and the second accumulated weight data 114(2).

At block 420, the service 102(2) generates the first service data 106(1) using the second service data 106(2). Continuing with the example, the service 102(2) may generate, using the account number, the user's address by retrieving the address from the database.

At block 422, the service 102(2) generates the first weight data 116(1). For example, the service 102(2) generates the first weight data 116(1) using the metric data 110. At block 424, the service 102(2) generates the first accumulated weight data 114(1) using the first weight data 116(1) and the second accumulated weight data 114(2). In some implementations, the service 102(2) generates the first accumulated weight data 114(1) using a plurality of additional accumulated weight data 114 received from a plurality of predecessor services 102(S).

At block 426, the service 102(2) transmits the first service data 106(1) and the first accumulated weight data 114(1). At block 428, the service 102(1) receives the first service data 106(1) and the first accumulated weight data 114(1).

At block 430, the service 102(1) stores the first service data 106(1) and the first accumulated weight data 114(1). This stored first accumulated weight data 114(1), representative of the service call pattern, may be sent to another device, such as a maintenance server, a user device, and so forth. In one implementation, the user device may include a display device configured to display the first service data 106(1) and the first accumulated weight data 114(1). The accumulated weight data 114 may be presented in a variety of ways such as using at least one of image data or sound data. For example, accumulated weight data 114 may be presented as text, a number, a color, or a sound.

Figure 7:
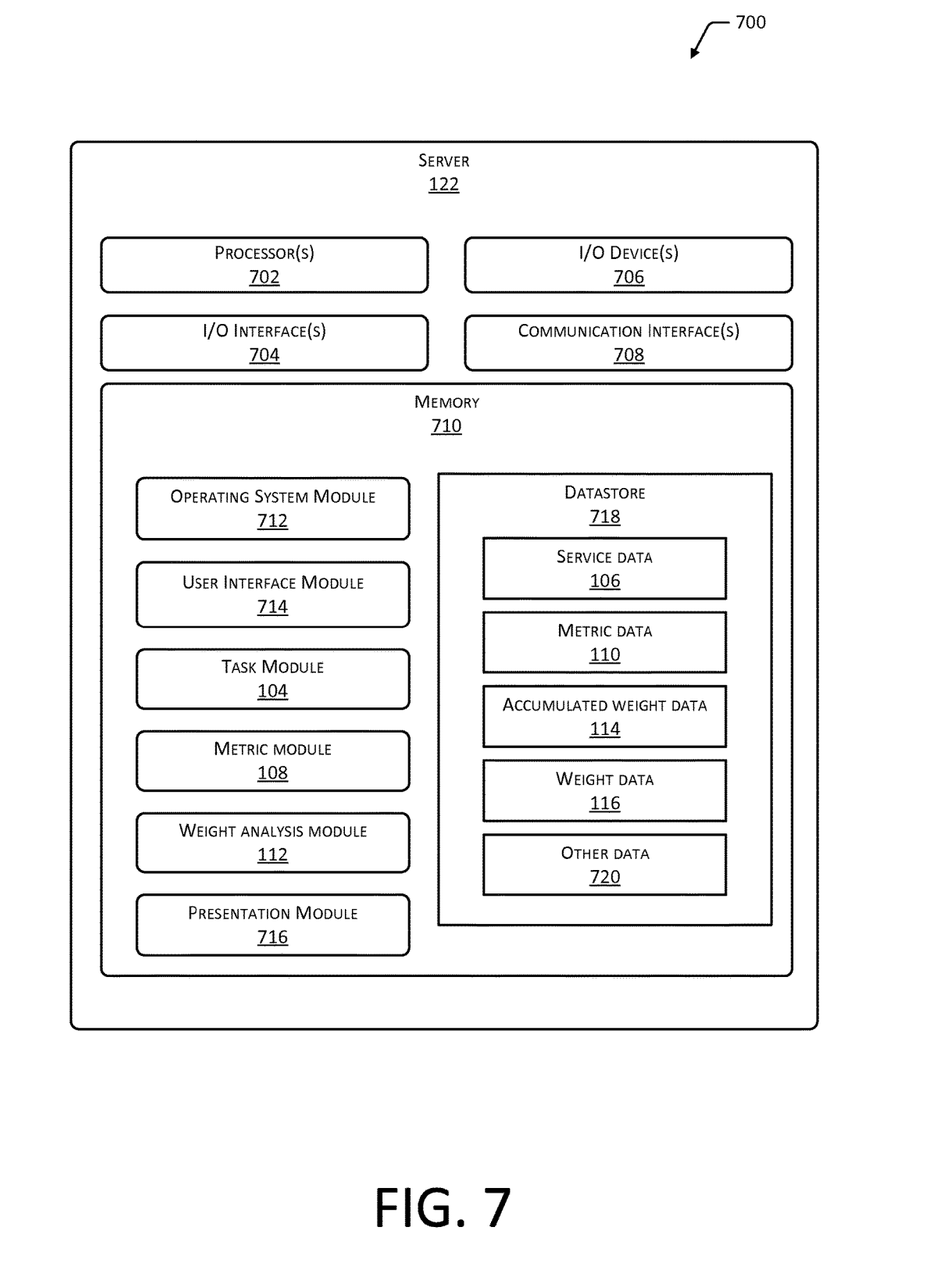
FIG. 7 is a block diagram of a server configured to execute one or more of the services in a service call pattern and generate accumulated weight data for the service call pattern.

FIG. 7 is a block diagram 700 of the server 122 which is configured to execute one or more of the services 102(S). The server 122 may include at least one processor 702 configured to execute stored instructions. The at least one processor 702 may comprise one or more cores.

The server 122 includes at least one input/output ("I/O") interface 704 which enables portions of the server 122 (e.g., the processor 702) to communicate with other devices. The I/O interface 704 may include inter-integrated circuit ("I2C"), serial peripheral interface bus ("SPI"), USB, RS-232, and so forth. The at least one I/O interface 704 may be communicatively coupled to at least one I/O device 706. In some implementations, certain I/O devices 706 are physically incorporated with the server 122 or externally placed.

The server 122 may include at least one communication interface 708. The communication interface 708 may be configured to provide communications between the server 122 and other devices, such as routers, access points, other servers 122, and so forth. The communication interface 708 may connect to one or more networks. The server 122 may include at least one bus or other internal communications hardware or software that enables for the transfer of data between the various modules and components of the server 122.

As illustrated in FIG. 7, the server 122 may include at least one memory 710. The memory 710 may include at least one computer-readable storage media ("CRSM"). The CRSM may include at least one of an electronic storage medium, a magnetic storage medium, an optical storage medium, a quantum storage medium, or a mechanical computer storage medium. The memory 710 may include computer readable instructions, data structures, program modules, and other data for the operation of the server 122.

The memory 710 may include at least one operating system ("OS") module 712. The OS module 712 may be configured to manage hardware resources such as the I/O interface 704, the I/O device 706, the communication interface 708, and provide various services to applications or modules executing on the processor 702. The I/O device 706 may include at least one of a display device or speakers. The memory 710 may also store at least one of the following modules which may be executed as foreground applications, background tasks, or daemons.

In some implementations, the memory 710 stores a user interface module 714 configured to provide a user interface to a user using the I/O devices 706 and to accept inputs received from the I/O devices 706. The user interface may include one or more visual, audible, or haptic elements. For example, the user interface may be configured to provide a graphic user interface, an audible user interface, and so forth. Also stored in the memory 710 may be the task module 104, the metric module 108, and the weight analysis module 112.

The task module 104 executes the one or more services 102. As described above, the task module 104 may generate first service data 106 using other service data 106 received from other services 102.

As discussed above, the metric module 108 is configured to generate the metric data 110. In one implementation, the metric module 108 generates the metric data 110 while or after performing the computational tasks. In another implementation, the metric module 108 may execute benchmark tests using predetermined service calls, input, and so forth. In this implementation, the benchmark may be executed periodically, such as every five minutes. The benchmark may run a number of tests against the service 102.

The weight analysis module 112 may generate the weight data 116 using the metric values 306 and associated weight factors 304. The accumulated weight data 114 may be based on at least one of locally generated weight data 116 or other accumulated weight data 114 received from other predecessor services 102 in the service call pattern. In some implementations, the metrics 302, the weight factors 304, or combinations thereof may be selected or modified to allow the accumulated weight data 114 to be tailored for particular situations. The weight analysis module 112 may be configured to enable the user to select or change one or more of the weight factors 304 using an input device. The weight analysis module 112 may be configured to automatically generate or determine one or more of the weight factors 304.

In some implementations, the memory 710 stores a presentation module 716 configured to present data such as the accumulated weight data 114 or the weight data 116. The presentation module 716 may present the data using output devices such as the display device and the speakers.

In some implementations, the memory 710 includes a datastore 718 for storing information. The datastore 718 may use a flat file, database, linked list, code, tree or other data structure to store the information. In some implementations, the datastore 718, or a portion thereof, may be distributed across at least one other device, such as another server 122, a network storage device, and so forth. As illustrated in FIG. 7, the datastore 718 may include the service data 106, the metric data 110, the accumulated weight data 114, the weight data 116, and other data 720.

As described above, the service data 106 is a result or output of the services 102(S). The service data 106 may include a variety of data, such image data, video data, product data, advertising data, offer service data, shipping data, search page data, tax data, pricing data, customer review data, encrypted data, transformed data, and so forth.

As described above, the metric data 110 may indicate a variety of metrics providing quantitative or qualitative measurements of the performance of the services 102(S). For example, the metrics may include the processor usage 302(1) (e.g., processor cycles consumed), the memory usage 302(2), the disk usage 302(3), the latency 302(4), the bytes send on the network 302(5), the number of TCP connections 302(6), the number of cache lookups 302(7), the number of transmitted service calls 302(8), the transactions per second 302(9), the predecessor service(s) weight 302(10), and so forth.

As described above, the accumulated weight data 114 may include an accumulated weight value that indicates the accumulated amount of resources of the computational tasks used by the services 102(S) in the service call pattern up to the point of the server 122 where the accumulated weight data 114 is accessed. Should the service call pattern continue on, the accumulated weight data 114 may continue to accrue, increasing the accumulated weight value.

The other data 720 may include a variety of data such as alarm thresholds, alarm data representative of accumulated weight data 114 which exceeds a threshold, and so forth. For example, an alarm threshold may be set such that when the accumulated weight data 114 for a particular service call pattern exceeds a threshold level at a particular service 102, an alarm is generated. The other data 720 may also include log data representative of recent events.

In some implementations, one or more services 102(S) are associated with contracts or service level agreements ("SLA") which may specify designated amounts of resources which the one or more services 102(5) may consume for a designated period of time, response time limitations, and so forth. In response to the one or more services 102(5) consuming more resources than the specified designated amount, alarm data may be generated indicating the occurrence of the one or more services 102(S) exceeding the designated amount. For example, the service 102(1) may be associated with a service level agreement which specifies that the service 102(1) may consume only up to one thousand units of memory resources per day. In response to the service 102(1) exceeding the one thousand units of memory for a day, another service 102 may generate alarm data indicating an occurrence of the service 102(1) exceeding the maximum amount of memory resources. The service 102 may send the generated alarm data such that a user associated with the service 102 may be notified of the occurrence.

Likewise, some services 102 may be configured to monitor other services 102. For example, a first service 102(1) may monitor a plurality of other services 102(1)-(99) which are associated by having a common contract or service level agreement.

Figure 8:
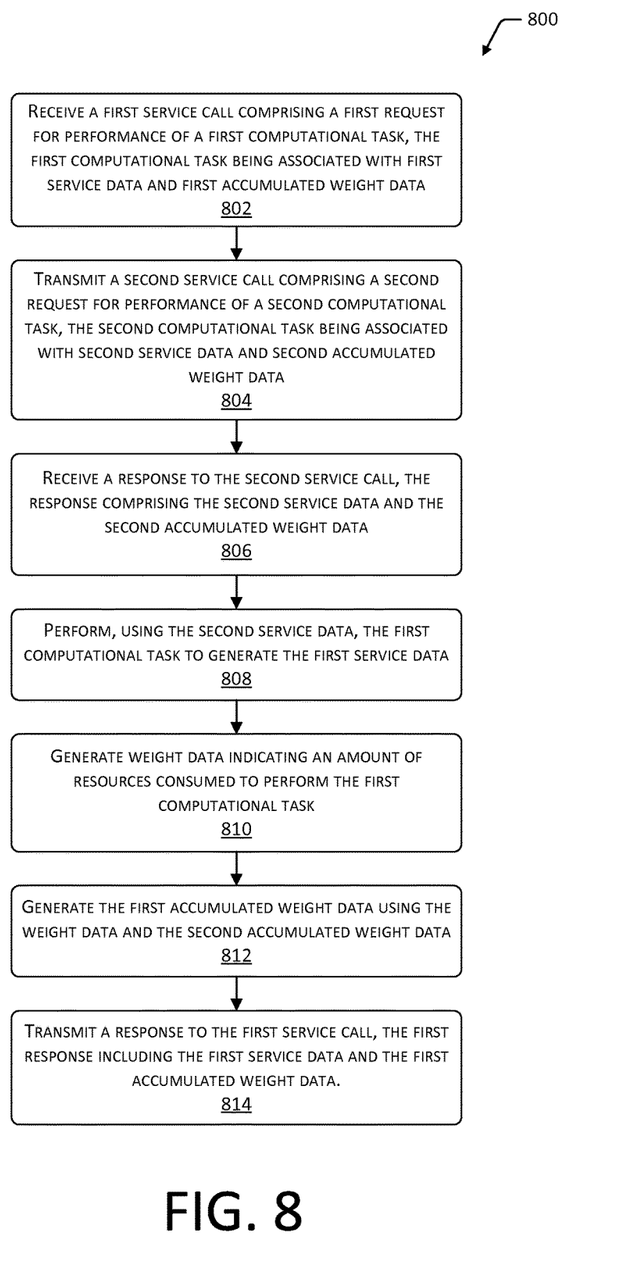
FIG. 8 is a flow diagram illustrating a process of generating accumulated weight data for a service call pattern.

FIG. 8 is a flow diagram illustrating a process 800 of generating accumulated weight data 114 using at least weight data 116 indicating an amount of resources consumed to process a computational task. Although the process 800 is described with reference to the flow diagram illustrated in FIG. 8, many other methods performing the acts associated with the process 800 may be used. For example, the order of many of the steps may be changed, some of the steps described may be optional, and additional steps may be included.

At block 802, the service 102(1) receives a first service call 118(1) comprising a first request for performance of a first computational task. In this example, the first computational task is associated with a first response 120(1), first service data 106(1), and first accumulated weight data 114(1). For example, the service 102(1) may receive the first service call 118(1) from a preceding service 102, and the service call 118(1) may include a request for search results of particular products based on entered search terms. In this example, the service 102(1) is configured to generate the search results and transmit the search results to the preceding service 102 in response to the first service call 118(1).

At block 804, the service 102(1) transmits a second service call 118(2) comprising a second request for performance of a second computational task. In this example, the second computational task is associated with a second response 120(2), second service data 106(2), and second accumulated weight data 114(2). Continuing with the example, the service 102(1) may transmit a second service call 118(2) to a predecessor service 102 which includes a request for image data associated with the products of the search result.

At block 806, the service 102(1) receives the second response 120(2) to the second service call 118(2). The second response 120(2) comprises the second service data 106(2) and the second accumulated weight data 114(2). The second service data 106(2) comprises a result of the second computational task. Continuing with the example, the service 102(1) may receive the image data associated with the products of the search result from the predecessor service 102. The second accumulated weight data 114(2) indicates an accumulated amount of resources consumed to perform the second computational task.

At block 808, the service 102(1) performs, using the second service data 106(2), the first computational task to generate the first service data 106(1). The first service data 106(1) comprises a result of the first computational task. Continuing with the example, the service 102(1) may generate the search results by retrieving products associated with the search terms and attaching the corresponding image data received from the predecessor service 102.

At block 810, the service 102(1) generates weight data 116 which indicates an amount of resources consumed to perform the first computational task. For example, the service 102(1) may generate the weight data 116 using metric data 110 generated during the processing of the first computational task.

At block 812, the service 102(1) generates the first accumulated weight data 114(1) using the weight data 116 and the second accumulated weight data 114(2). In this example, the first accumulated weight data 114(1) indicates an accumulated amount of resources consumed to perform the first computational task and the second computational task. In other examples, the first accumulated weight data 114(1) indicates an accumulated amount of resources consumed to perform the first computational task, the second computational task, and the generation of the first accumulated weight data 114(1). The first accumulated weight data 114(1) may further represent other metrics such as latency, transactions per second associated with the first computational task and the second computational task, disk usage associated with the first computational task and the second computational task, and number of cache lookups associated with the first computational task and the second computational task. The service 102(1) may generate the first accumulated weight data 114(1) using a weighted mean of a first number associated with the first weight data 116(1) and a second number associated with the second accumulated weight data 114(2). In some implementations, the service 102(1) generates the first accumulated weight data 114(1) using additional accumulated weights 114 received from other services 102(S). In another implementation, the accumulated weight data 114 may comprise an array of weight data 116 from predecessor services.

At block 814, the service 102(1) transmits the first response 120(1) to the first service call 118(1). The first response 120(1) comprises the first service data 106(1) and the first accumulated weight data 114(1). service 102 Continuing with the example, the first response may include the search results including the corresponding image data and accumulated weight data 114 which indicates an amount of resources consumed to perform the generation of the search results including the corresponding image data. In some implementations, the first service data 106(1) is transmitted separate from the first accumulated weight data 114(1).

Figure 9:
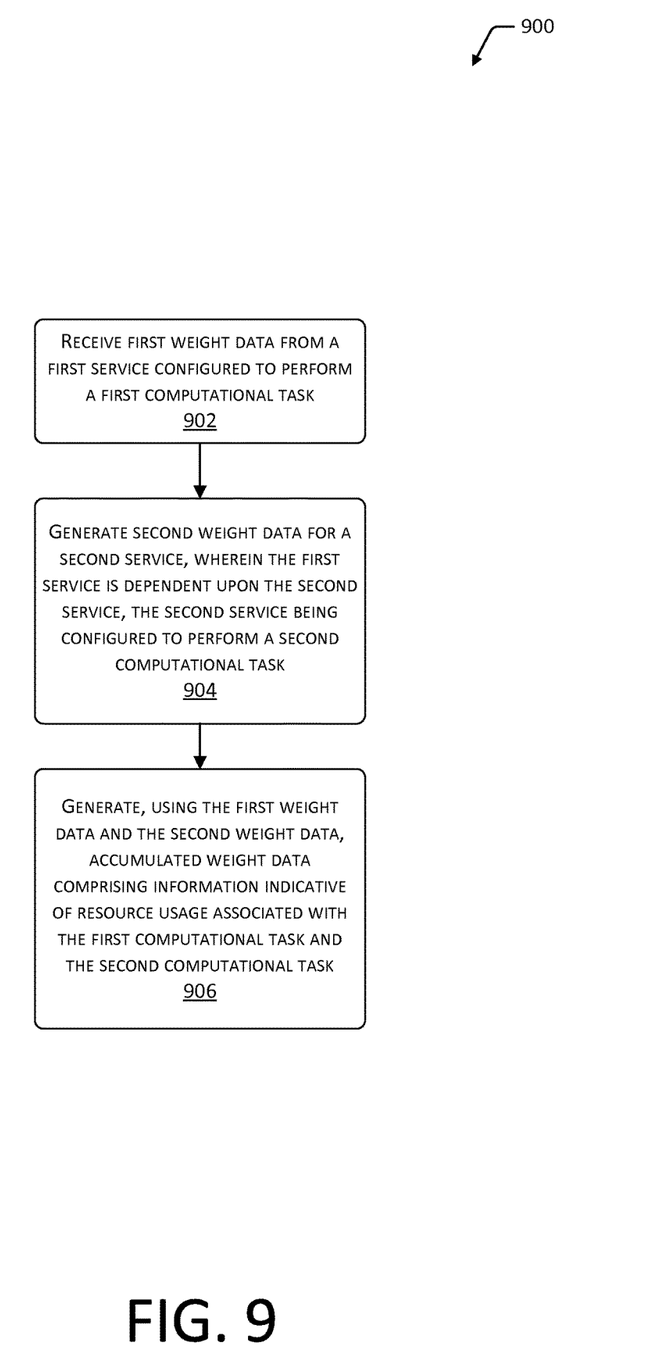
FIG. 9 is a flow diagram illustrating a process of generating accumulated weight data for a service call pattern based on weight data generated by one service and weight data received from one or more predecessor services.

FIG. 9 is a flow diagram illustrating a process 900 of generating different accumulated weight data 114 for different services 102(S). Although the process 900 is described with reference to the flow diagram illustrated in FIG. 9, many other methods performing the acts associated with the process 900 may be used. For example, the order of many of the steps may be changed, some of the steps described may be optional, and additional steps may be included.

At block 902, the service 102 receives first weight data 116(1) from a first service 102(1) configured to perform first data processing. A first server 122(1) may execute the first service 102(1). The first weight data 116(1) may include a plurality of different weight data 116 received from different services 102. The plurality of different weight data 116 may be structured as an array of different weight data 116. In some implementations, the first service 102(1) may generate the accumulated weight data 114 using the different weight data 116.

At block 904, the service 102 generates second weight data 116(2) for a second service 102(2). In this example, the first service 102(1) is dependent upon the second service 102(2) which performs the second data processing. A second server 122(2) may execute the second service 102(2). The second weight data 116(2) may be generated based on various metrics 302 associated with the second data processing such as latency, transactions per second, disk usage associated with the second data processing, and number of cache lookups.

At block 906, the service 102 generates, using the first weight data 116(1) and the second weight data 116(2), accumulated weight data 114 comprising information indicative of resource usage associated with the first data processing and the second data processing. The resource usage may include at least one of memory usage or processor usage. The service 102 may use the accumulated weight data 114 to allocate resources or generate costs associated with the computational tasks. In some implementations, the service 102 enables a user to change the input data used to generate the accumulated weight data 114. The service 102 may generate the accumulated weight data 114 at a predetermined time. The service 102 may generate the accumulated weight data 114 after an occurrence of a predetermined number of service calls 118.

In some implementations, a particular service 102 may enable a user to select or change which weight data 116 is received by the particular service 102. For example, the user may configure the particular service 102 to receive the weight data 116 generated by one or more particular predecessor services 102. The service 102 may enable the user to configure the service 102 such that the service 102 does not receive the accumulated weight data 114 for a service call 118, and only receives specified weight data 116 from one or more services 102.

In some implementations, the service 102 may generate alarm data. For example, the service 102 may generate the alarm data in response to a value associated with the accumulated weight data 114 being equal to or greater than a threshold amount.

Figure 10:
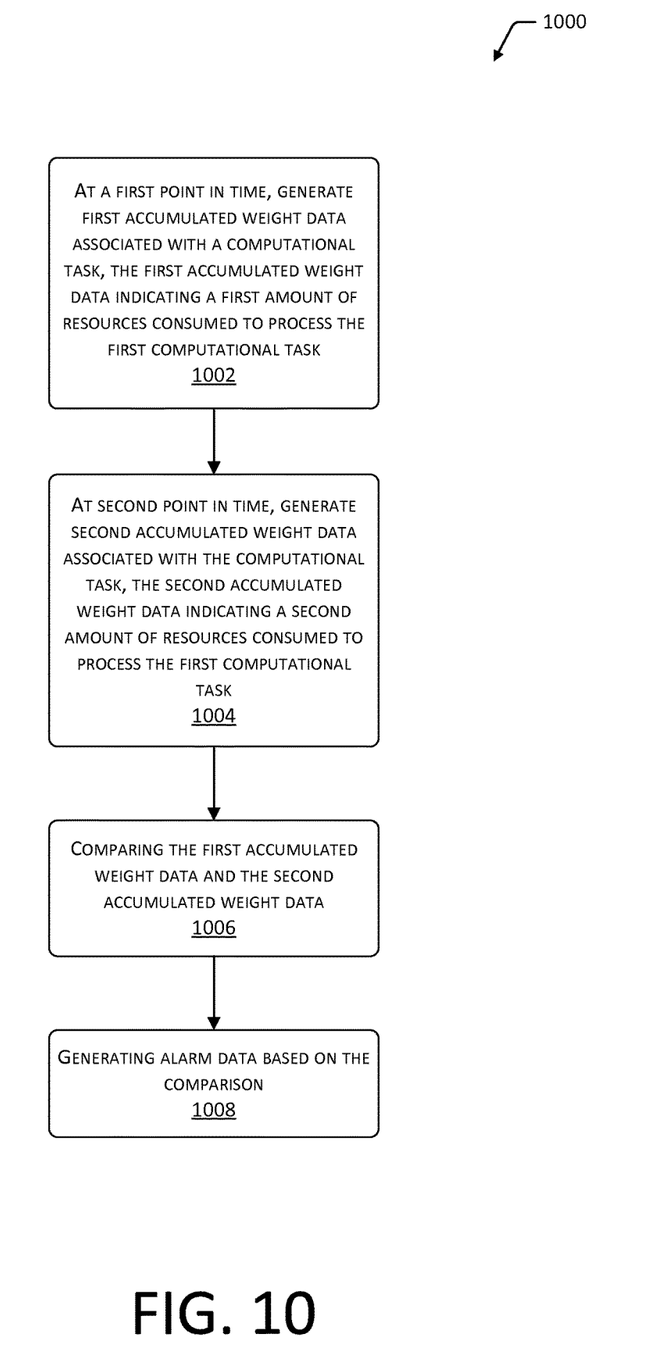
FIG. 10 is a flow diagram illustrating a process of generating alarm data in response to a threshold difference in accumulated weight data.

FIG. 10 is a flow diagram illustrating a process 1000 of generating alarm data in response to a threshold difference between amounts of resources being consumed. Although the process 1000 is described with reference to the flow diagram illustrated in FIG. 10, many other methods performing the acts associated with the process 1000 may be used. For example, the order of many of the steps may be changed, some of the steps described may be optional, and additional steps may be included.

At block 1002, at a first point in time, the service 102 generates first accumulated weight data 114(1) associated with a computational task. The first accumulated weight data 114(1) indicates a first amount of resources consumed to perform the first computational task. The service 102 may generate the first accumulated weight data 114(1) using a first plurality of weight data 116(1) associated with one or more predecessor computational tasks employed to perform the first computational task.

At block 1004, at a second point in time, the service 102 generates the second accumulated weight data 114(2) associated with the computational task. The second accumulated weight data 114(2) indicates a second amount of resources consumed to perform the first computational task. The service 102 may generate the second accumulated weight data 114(2) using a second plurality of weight data 116(2) associated with the one or more predecessor computational tasks employed to perform the first computational task.

At block 1006, the service 102 compares the first accumulated weight data and the second accumulated weight data.

At block 1008, the service 102 generates alarm data based on the comparison. For example, the service 102 may compare by calculating a difference between the first accumulated weight data and the second accumulated weight data. The service 102 may generate alarm data based at least in part on the difference meeting or exceeding a threshold value. The service 102 may send the alarm data to an output device such as the display device or the speakers to present the alarm data.

In some implementations, the service 102 receives the weight data 116 used to generate the accumulated weight data 114 after an occurrence of a predetermined number of service calls 118.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A non-transitory computer readable storage media including instructions to cause one or more processors to:

receive, by a first service, a first service call comprising a first request for performance of a first computational task by the first service, the first computational task being associated with a first response, first service data, and first accumulated weight data;

transmit a second service call comprising a second request for performance of a second computational task by a second service, the second computational task being associated with a second response, second service data, and second accumulated weight data, wherein the first computational task is dependent on the second computational task;

receive, by the first service, the second response to the second service call, the second response comprising:
  the second service data which comprises a result of the second computational task performed by the second service; and
  the second accumulated weight data generated by the second service, wherein the second accumulated weight data indicates an accumulated amount of resources consumed to perform the second computational task;

perform, using the second service data, the first computational task by the first service to generate the first service data, the first service data comprising a result of the first computational task;

generate first weight data, the first weight data indicating a first amount of resources consumed to perform the first computational task;

generate, by the first service, the first accumulated weight data using the first weight data and the second accumulated weight data, the first accumulated weight data indicating an accumulated amount of resources consumed to perform the first computational task and the second computational task;

transmit the first response to the first service call, the first response comprising the first service data and the first accumulated weight data;

determine a cost associated with the first service call and the second service call based on the first accumulated weight data; and optimize a service call pattern based on the cost.

2. The non-transitory computer readable storage media of claim 1, instructions to further cause the one or more processors to:
  transmit a third service call to a third service prior to performing the first computational task, the third service call comprising a third request for a performance of a third computational task, the third computational task being associated with a third response, third service data, and third weight data;
  receive the third response to the third service call, the third response comprising:
    the third service data which comprises a result of the third computational task performed by the third service; and
    the third weight data generated by the third service which indicates an amount of resources consumed to perform the third computational task; and
  wherein the first accumulated weight data is updated by adding the third weight data; and
  the first service data is regenerated using the second service data and the third service data.

3. The non-transitory computer readable medium storage media of claim 1, wherein:
  the first accumulated weight data is generated using a weighted mean of a first number associated with the first weight data and a second number associated with the second accumulated weight data; and
  the first accumulated weight data is based at least in part on one or more of:
    latency associated with the first computational task and the second computational task;
    transactions per second associated with the first computational task and the second computational task;
    disk usage associated with the first computational task and the second computational task; or
    number of cache lookups associated with the first computational task and the second computational task.

4. The non-transitory computer readable storage media of claim 1, wherein:
  the second service transmits additional service calls for a plurality of additional computational tasks performed by additional services; and
  the second service generates the second accumulated weight data, wherein the second accumulated weight data indicates the accumulated amount of resources consumed to perform the second computational task and an accumulated amount of resources consumed to perform the plurality of additional computational tasks.

* * * * *